(12) United States Patent
Hsu

(10) Patent No.: US 8,139,863 B1
(45) Date of Patent: Mar. 20, 2012

(54) SYSTEM FOR CAPTURING, CHARACTERIZING AND VISUALIZING LIDAR AND GENERIC IMAGE DATA

(76) Inventor: Shin-yi Hsu, Vestal, NY (US)

( * ) Notice: Subject to any disclaimer, the term of this patent is extended or adjusted under 35 U.S.C. 154(b) by 944 days.

(21) Appl. No.: 12/150,182

(22) Filed: Apr. 25, 2008

(51) Int. Cl.
*G06K 9/46* (2006.01)

(52) U.S. Cl. ......... 382/190; 382/103; 382/173; 382/181

(58) Field of Classification Search .................. 382/103, 382/154, 173, 190
See application file for complete search history.

(56) References Cited

U.S. PATENT DOCUMENTS

| | | | | |
|---|---|---|---|---|
| 5,140,416 | A * | 8/1992 | Tinkler | 348/33 |
| 5,414,474 | A * | 5/1995 | Kamada et al. | 348/700 |
| 5,638,164 | A * | 6/1997 | Landau | 356/5.01 |
| 5,640,468 | A * | 6/1997 | Hsu | 382/190 |
| 6,151,424 | A * | 11/2000 | Hsu | 382/294 |
| 6,404,920 | B1 * | 6/2002 | Hsu | 382/190 |
| 6,654,690 | B2 * | 11/2003 | Rahmes et al. | 702/5 |
| 6,741,744 | B1 * | 5/2004 | Hsu | 382/229 |
| 7,194,389 | B2 * | 3/2007 | Damron | 703/2 |
| 7,343,051 | B1 * | 3/2008 | Hsu | 382/294 |
| 7,567,731 | B2 * | 7/2009 | McDowall et al. | 382/294 |
| 7,702,425 | B2 * | 4/2010 | Hougen | 701/1 |
| 7,778,808 | B2 * | 8/2010 | Miller et al. | 703/2 |
| 7,860,344 | B1 * | 12/2010 | Fitzpatrick et al. | 382/291 |
| 2004/0105573 | A1 * | 6/2004 | Neumann et al. | 382/103 |
| 2005/0063593 | A1 * | 3/2005 | Nelson | 382/190 |
| 2006/0228019 | A1 * | 10/2006 | Rahmes et al. | 382/154 |
| 2007/0269102 | A1 * | 11/2007 | Wang | 382/154 |
| 2009/0005987 | A1 * | 1/2009 | Vengroff et al. | 701/300 |
| 2009/0034837 | A1 * | 2/2009 | Kato et al. | 382/167 |
| 2009/0185741 | A1 * | 7/2009 | Nahari et al. | 382/154 |
| 2009/0208095 | A1 * | 8/2009 | Zebedin | 382/154 |

OTHER PUBLICATIONS

U.S. Appl. No. 11/074,245, Hsu.
U.S. Appl. No. 10/421,954, Hsu.

* cited by examiner

*Primary Examiner* — Jason M Repko
*Assistant Examiner* — Gandhi Thirugnanam
(74) *Attorney, Agent, or Firm* — Mark Levy; Hinman, Howard & Kattell, LLP

(57) ABSTRACT

A system that offers a method of capturing, analyzing, and visualizing a matrix of data for object and feature extraction. This is accomplished by reading a matrix of data represented by a plurality of data types into a processor via a data capture system. The matrix of data is overlaid by a control grid to form a regular matrix having a plurality of cells. A data search spatial radius is created from a point in each cell. Data is then processed from the matrix and certain characteristics are captured and represent each variable in each cell of the matrix, and then output, respectively.

19 Claims, 16 Drawing Sheets
(16 of 16 Drawing Sheet(s) Filed in Color)

SYSTEM FOR CAPTURING, CHARACTERIZING AND VISUALIZING LIDAR AND GENERIC IMAGE DATA

FIELD OF THE INVENTION

The present invention relates to object and feature extraction in photographs and, more particularly, to object and feature extraction from LIDAR and generic image data.

BACKGROUND OF THE INVENTION

Since the launch of the Earth's Technological Satellite (ERTS), now known as LANDSAT, in 1972, numerous software packages have been developed and used to visualize and analyze multispectral imagery (MSI) data. Since the vast majority of MSI data have been prepared in a form of a regular matrix where missing data points are extremely rare, users in general have had no problem in filling in missing data. Thus, such users do not need to examine whether given software has an option to handle irregular data points, or whether the method is appropriate.

With an increasing use of Light Detection and Ranging (LIDAR) and with the advancement of GPS as a navigation system since the 1980s, users of remotely sensed imagery must handle missing data points and must know whether the methods to generate LIDAR-based images for feature and object extraction are appropriate. Inherently, LIDAR data points are not regularly spaced, and non-edited, point cloud LIDAR elevation data do not lend themselves to filling in missing data points by interpolation. For example, a conventional linear interpolation usually means that the values for intermediate mid-point data points are estimated by using the average from the two end points. A more sophisticated technique is a curvilinear interpolation method that takes the slope between two points into account. A commonly used interpolation algorithm in many software packages is known as the Inverse Distance Weighted (IDW) algorithm.

The question in turn, is not which interpolation scheme is better, but rather, is it fundamentally inappropriate to interpolate LIDAR's elevation data. For example, consider three buildings on a straight line. The two buildings on either side are of elevation 100 feet and 200 feet, respectively. By a linear interpolation, the building located at the middle of these two buildings would be 150 feet. Suppose however that ten buildings are at varying distances for the to-be-estimated building height. Although the IDW or any other interpolation technique can be used to estimate the building height, the process is illogical, and can lead to discrepancies.

Fundamentally, "to interpolate or not to interpolate" is a question of whether the given data distribution follows a discrete function or a continuous function. If the data distribution follows a continuous function, interpolation is appropriate. But if the data distribution is fundamentally discrete, like elevation data of buildings, interpolation should not be applied.

Currently, no system offers a method to capture, characterize, and visualize fundamentally discrete distribution data, such as LIDAR data, and extends the process to include generic image data for object and feature extraction.

A survey of methods used by conventional image processing software packages such as Idrisi (Idrisi is a registered trademark of Trustees of Clark University), Erdas (Erdas is a registered trademark of Erdas, Inc.), Global Mapper, and ArcGIS (ArcGIS is a registered trademark of ENVIRONMENTAL SYSTEMS RESEARCH INSTITUTE, INC.) reveals that a general sequence to generate an image from a LIDAR data set in the format of common separated vector (csv) first generates a Triangulated Irregular Network (TIN) and then performs interpolation on the TIN by interpolation such as IDW to generate an image.

Since using interpolation algorithms to convert an irregular matrix to a regular matrix for image generation is inappropriate when the data follows a discrete distribution, it would be advantageous to devise a system that receives and converts irregular matrix data into regular matrix data without the use of interpolation.

It is also advantageous to devise such a system that can handle irregular matrix data in various forms of data-point resolution and spatial density distribution, such as LIDAR returns.

It is also advantageous to design the data capture and visualization system to handle not only LIDAR data, but also generic image data like multispectral data.

Once the new data capture and visualization system for object and feature extraction can incorporate both LIDAR and generic image data, it is also advantageous that the system performs geoimage registration without altering the original LIDAR and generic image data.

It is advantageous for a new system to capture, characterize and visualize data for object and feature extraction by using dynamically adjustable pixel resolutions and controlling the radius of the data capture spatial domain.

It is also advantageous to capture the characteristics of data within a predetermined spatial domain, to know minimum, maximum, average, range and other statistical measurements.

It is also advantageous to generalize the data capture, characterization, and visualization from LIDAR data to generic image data.

It is also advantageous for a system to provide a measurement tool to capture and visualize data characteristics at a region of interest (ROI) or location of interest (LOI).

It is also advantageous for a system to display the captured data characteristics.

It is also advantageous for a system to provide a graphical user interface (GUI) to perform the discussed functions with relative ease.

Once the multiple data characteristics image layers are generated, it is advantageous to generate one or more data signatures for object and feature extraction.

It is also advantageous to generate color composites from LIDAR-derived bands to simulate natural color and color infrared (CIR) bands derived from conventional multispectral imagery.

Once multiple signatures from a region of interest are generated, it is advantageous to develop a parameter adjustable rule set for object and feature extraction.

It is also advantageous for a system to perform parameter adjustment at the individual signature level in addition to a group level.

It is most advantageous for a system to perform parameter adjustment in various object extraction domains, such as the number of signatures, the signature matching level, the density matching level, the radius of the search area, and so on.

For object and feature extraction, as well as display, it is also advantageous for a system to perform fusion between LIDAR and other sources, such as multispectral imagery.

It is also advantageous for a system to generate the most generalized objects and feature signatures automatically.

It is also advantageous for a system to generate the image that captures the dominant object or feature in the input image set.

It is also advantageous for a system to perform object and feature extraction using matching digital number (DN) values that do not match closely with dominant ones.

It is also advantageous for a system to perform object and feature extraction by combining both user-specified and automatically generated spectral signatures.

SUMMARY OF THE INVENTION

In accordance with the present invention, there is provided a system that offers a method of capturing, analyzing, and visualizing a matrix of data for object and feature extraction. This is accomplished by reading a matrix of data represented by a plurality of data types into a processor via a data capture system. The matrix of data is overlaid by a control grid to form a regular matrix having a plurality of cells. A data search spatial radius is created from a point in each cell. Data is then processed from the matrix and certain characteristics are captured and represent each variable in each cell of the matrix, and then output, respectively.

During the process of capturing a data point, it is important to note that no interpolation is used under the inventive system. Once data points are captured, the method then applies parameter-specified rule sets to the information for object and/or feature extraction. Once the object/feature is extracted, the inventive system outputs the generated result. The result then undergoes change detection or environmental assessment and the final product is generated.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 2 is a screen shot showing an example of LIDAR data in common separated vector (.cvs) or binary (.bin) format to be read in;

DETAILED DESCRIPTION OF THE PREFERRED EMBODIMENT

The invention features a method and system for extracting objects and features in photographs by capturing, analyzing, and visualizing a matrix of data that had been previously extracted from the aforementioned photographs. The regularly, or irregularly distributed data is then fed into a processor as a matrix of data points by the capture system. The captured data then undergoes through a parameter specific rule set and is then outputted by the system.

"Earth's Technological Satellite (ERTS), LANDSAT, Global Mapper, Geospatial Imagery Viewer, and GSIview" are terms used within the application that are either not registered or dead trademarks.

Figure 1:
FIG. 1 is a screen shot depicting a GUI from a Geospatial Imagery Viewer (GSIview)

FIG. 1 depicts a data input GUI from GeoSpatial Imagery (GSI). A "load data" command reads the irregular or regular matrix data into the inventive system entitled GSIview.

Figure 2:
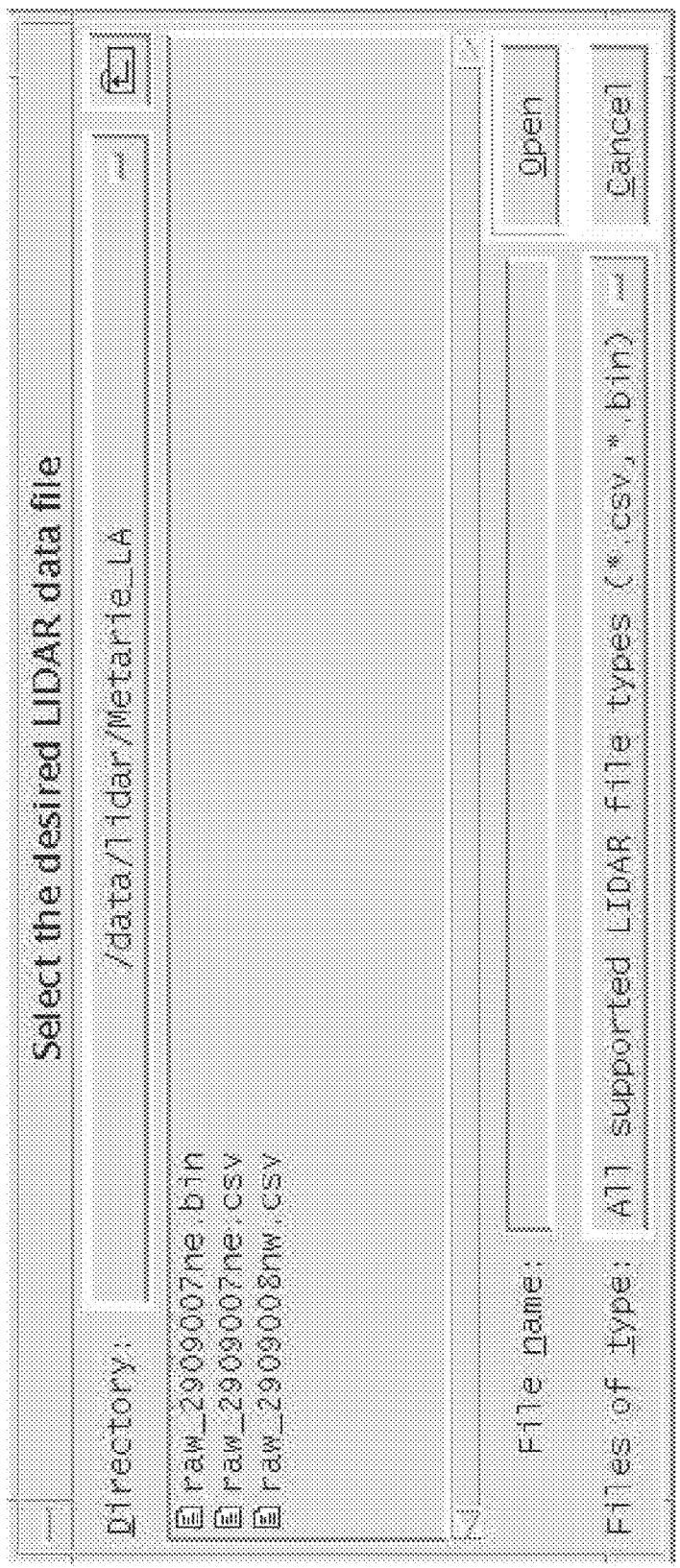

FIG. 2 shows an example of LIDAR data in common separated vector (csv) or binary (bin) format to be read in.

Figure 3:
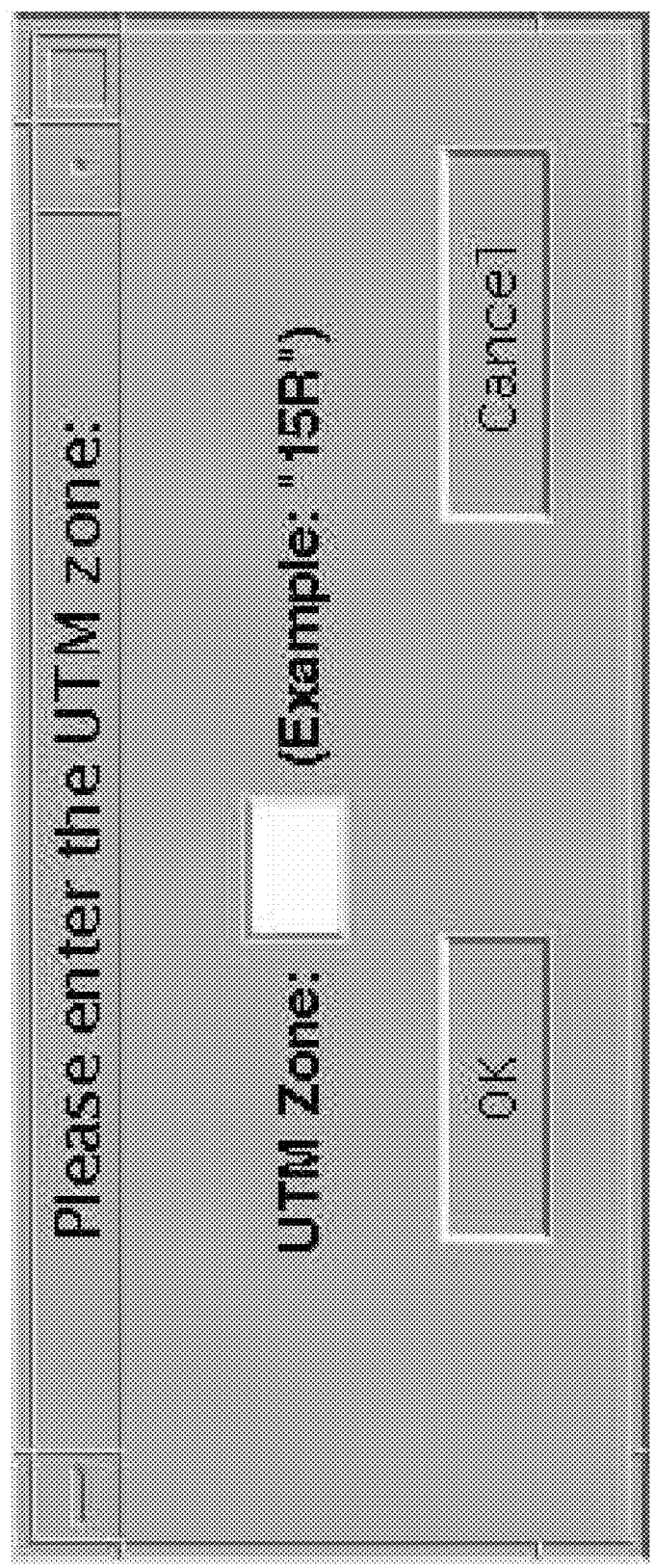
FIG. 3 is a screen shot showing the GUI for a required Universal Transverse Mercator (UTM) zone.

FIG. 3 shows the graphical user interface (GUI) for a required Universal Transverse Mercator (UTM) zone.

Figure 4:
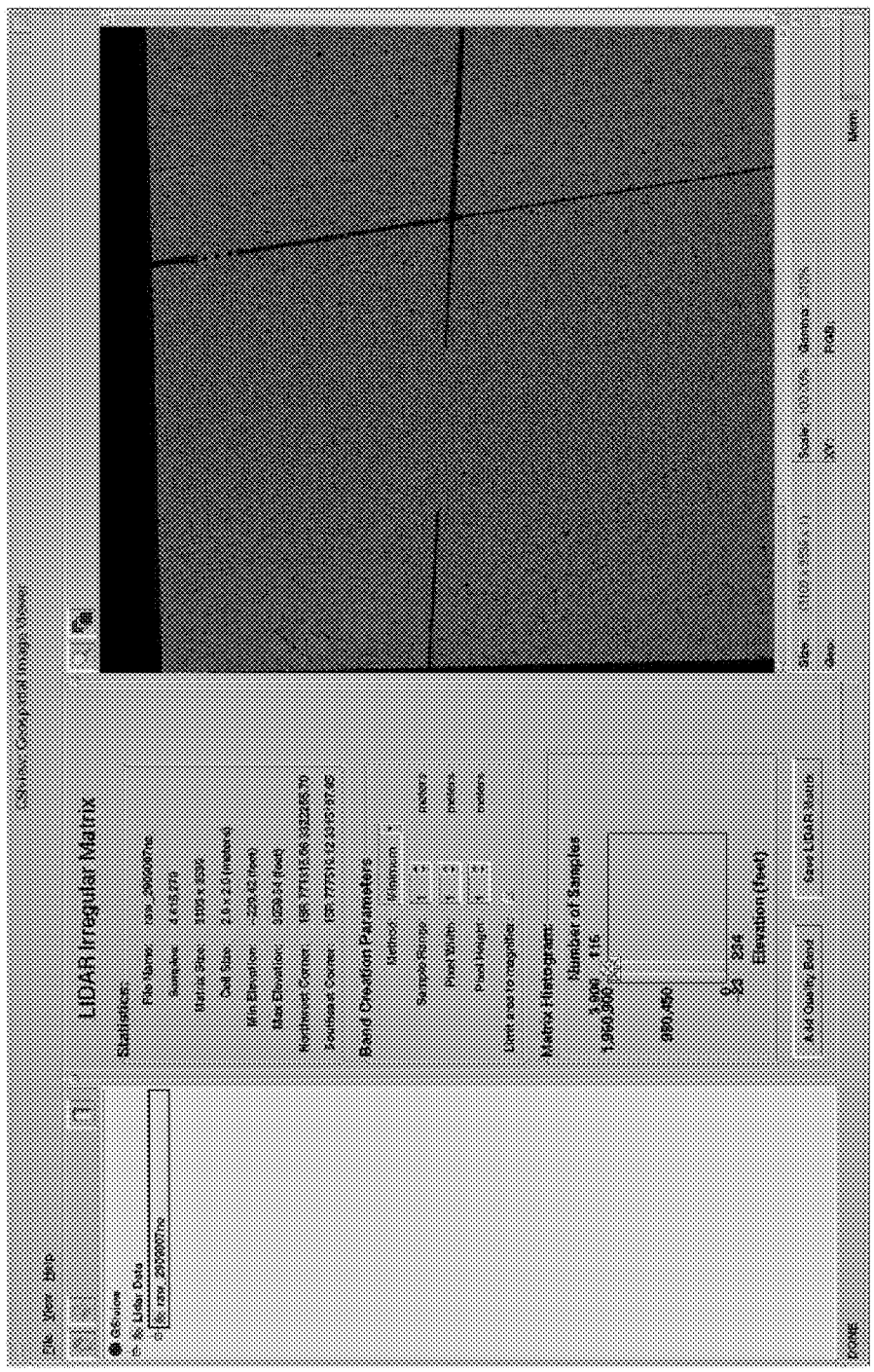
FIG. 4 is a screen shot showing how the inventive system handles LIDAR data by slicing data into different desired elevation bins.

FIG. 4 shows how the inventive system handles LIDAR data by slicing data into different desired elevation bins. In addition, the system allows the user to specify both the pixel-size resolution and the spatial data search domain for data capture. Furthermore, a method box allows the user to specify a data measurement item for generating an image. For example, a GUI specifies the image that generates the minimum data value computed from the data points in the data search spatial domain for each cell of the matrix to generate an image.

Figure 5:
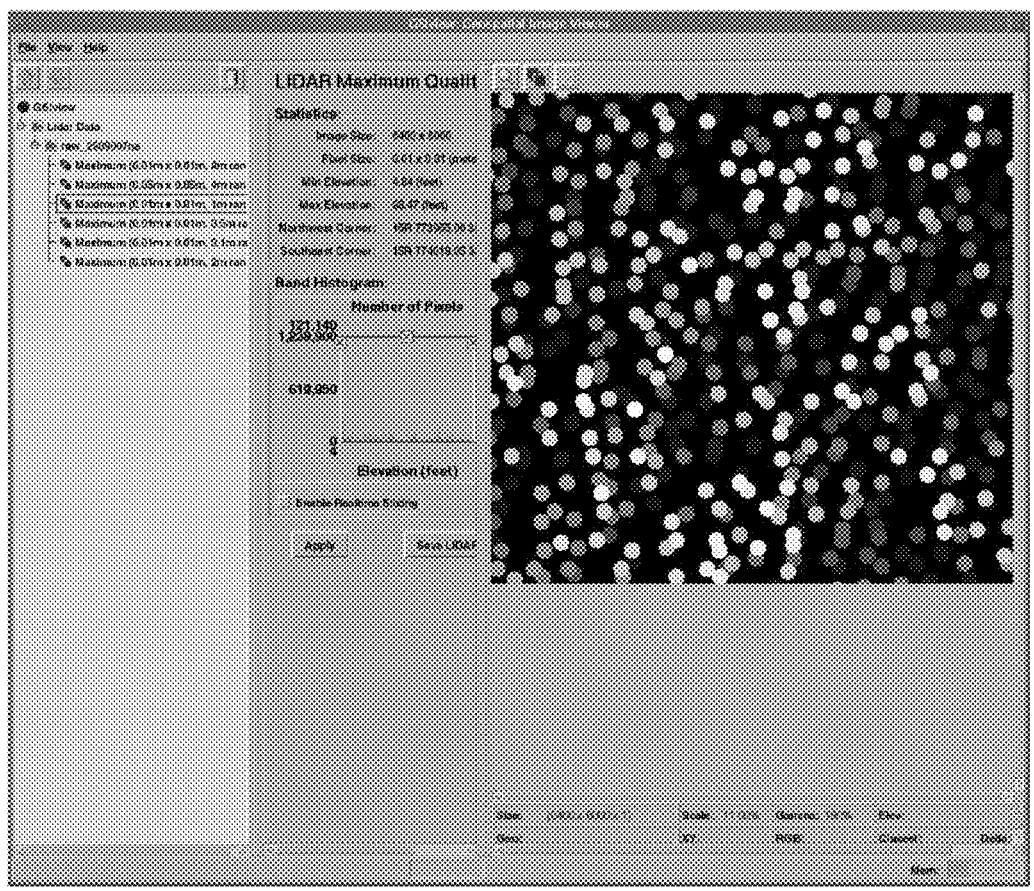
FIG. 5 is a screen shot showing six generated images listed on the left hand side of the GUI panel.

FIG. 5 shows further that the system has generated six images listed on the left side of the GUI panel. Note that in this case, two resolutions are provided with five ranges. In addition, the x-scale and y-scale of the pixel is 0.01 meter and 0.05 meter respectively. For 0.01-meter resolution the images cover four spatial cell resolutions: (a) 0.1 meter, (b) 0.5 meters, (c) 2 meters and (d) 4 meters; the displayed image is at the 1-meter range level.

Figure 6:
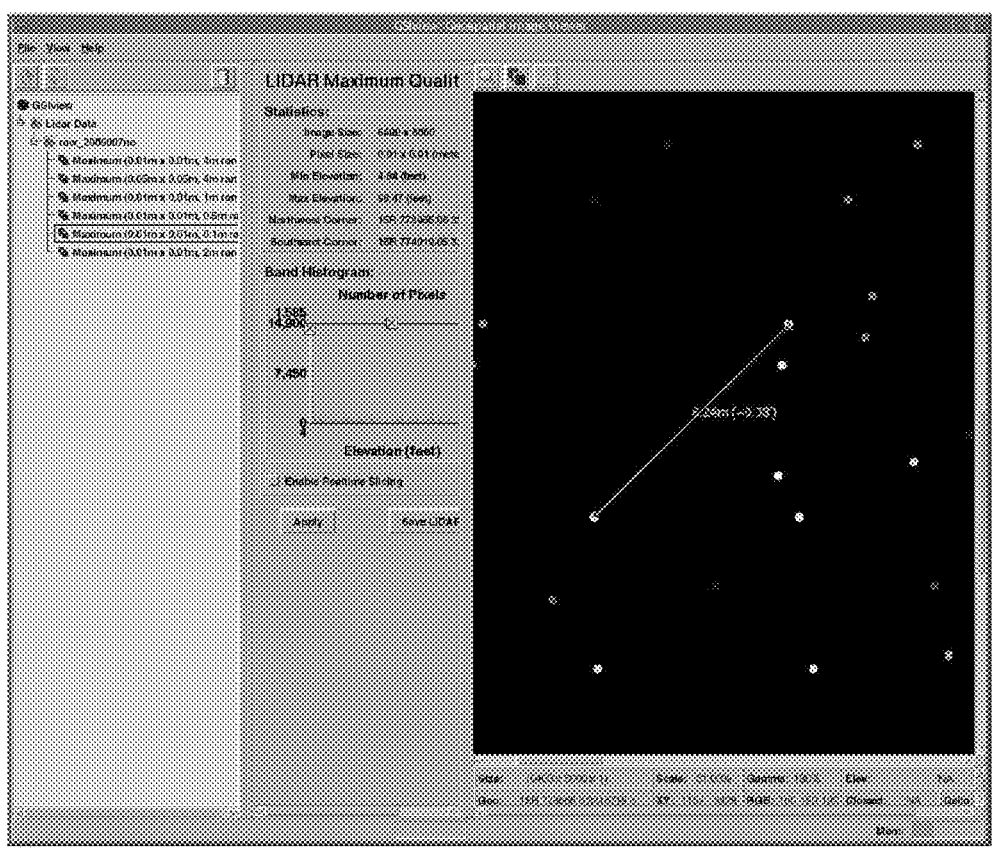
FIG. 6 is a screen shot showing the inventive system providing a measurement tool for measuring the distance and height from two locations of interest using one of the generated images.

FIG. 6 shows the inventive system providing a measurement tool for measuring the distance and height from two locations of interest. Since both the distance and the difference in elevation are given, the slope can be calculated.

Figure 7:
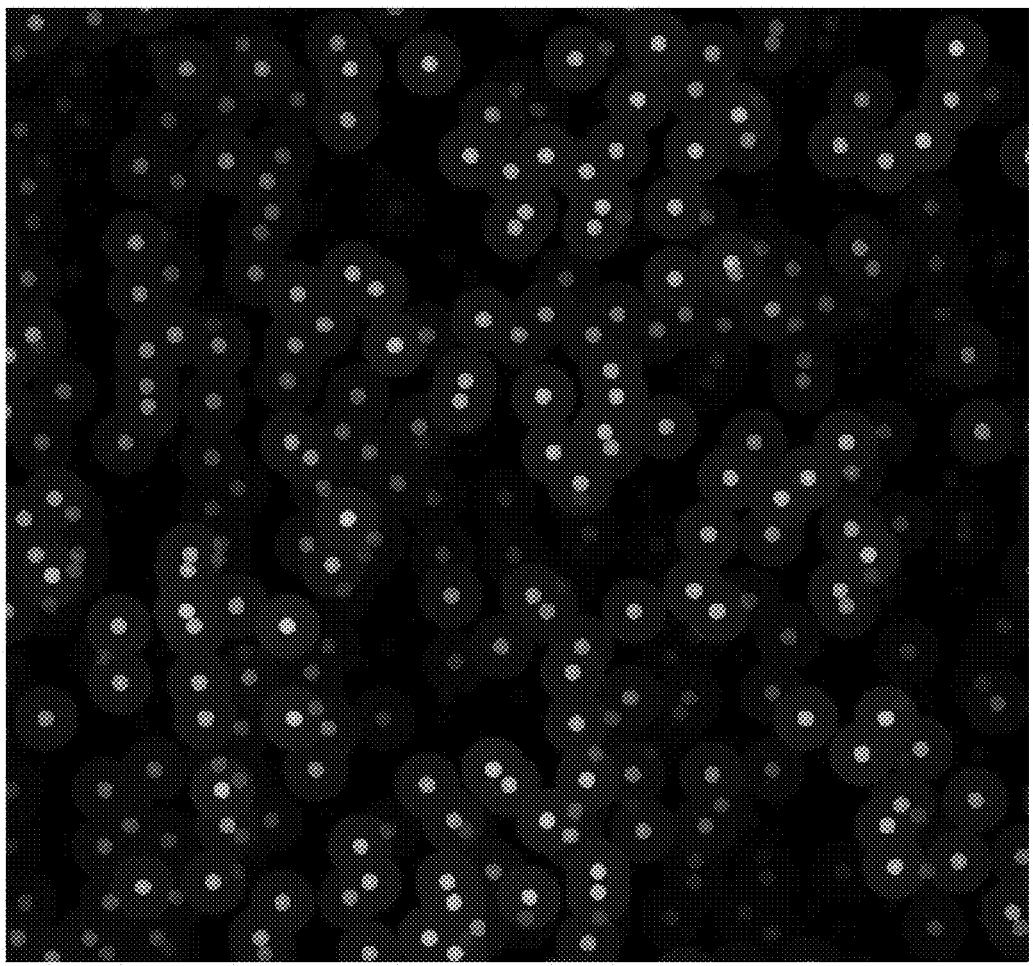
FIG. 7 shows a composite of three spatial cell resolutions.

FIG. 7 shows a composite of three spatial cell resolutions.

Figure 8:
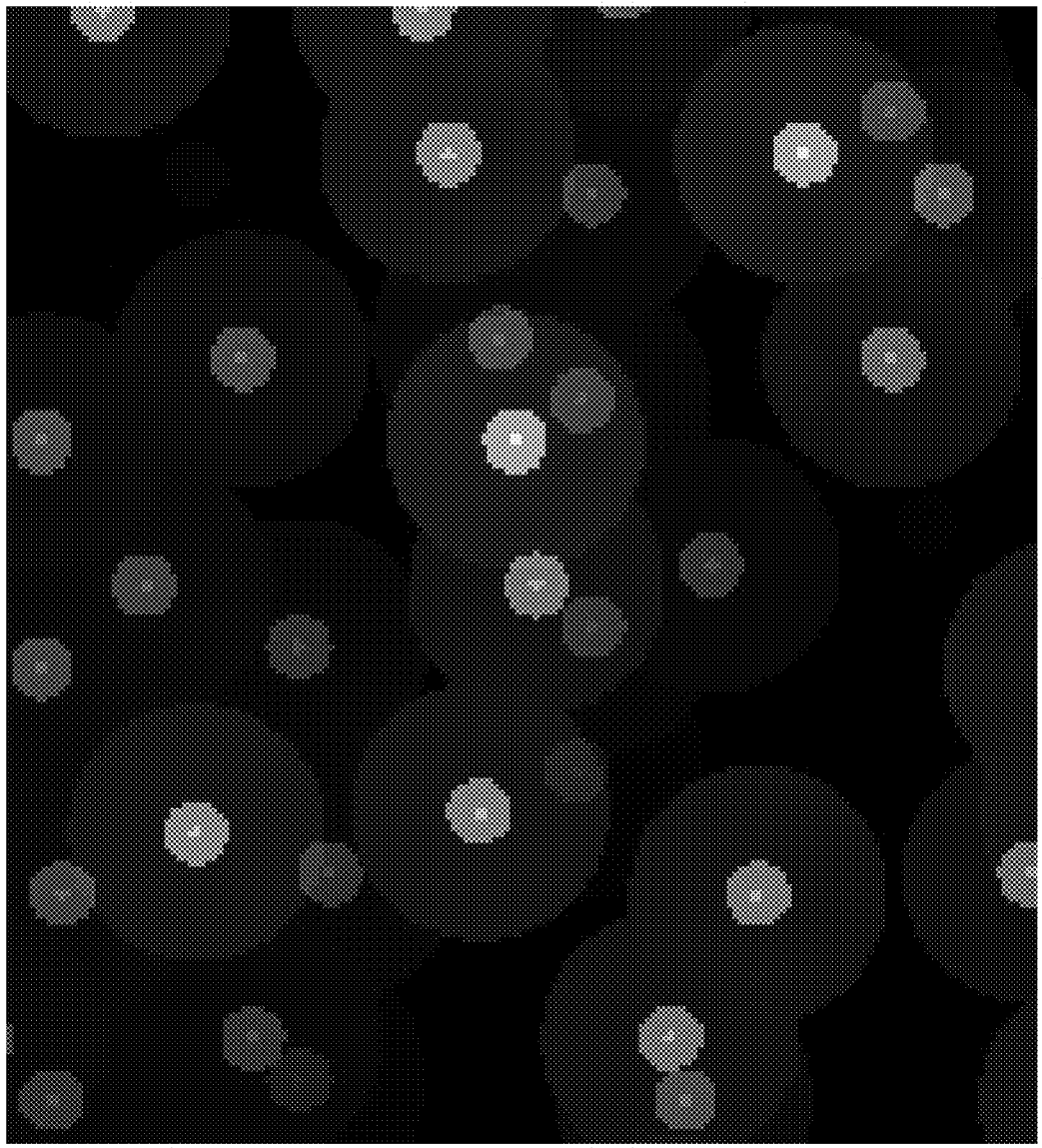
FIG. 8 is an enlarged view of FIG. 7.

FIG. 8 is an enlarged view of FIG. 7. The inventive system clearly shows:

Three levels of spatial domain resolutions used to capture data points

One type of data cell only has only one data point.

A second type of data cell has two data points.

A third type of the data cells has three data points.

The big-size cells overlap spatially.

The spatial cell structure is not a TIN.

It should be emphasized again that no interpolation is used to capture data points under the inventive system.

Figure 9:
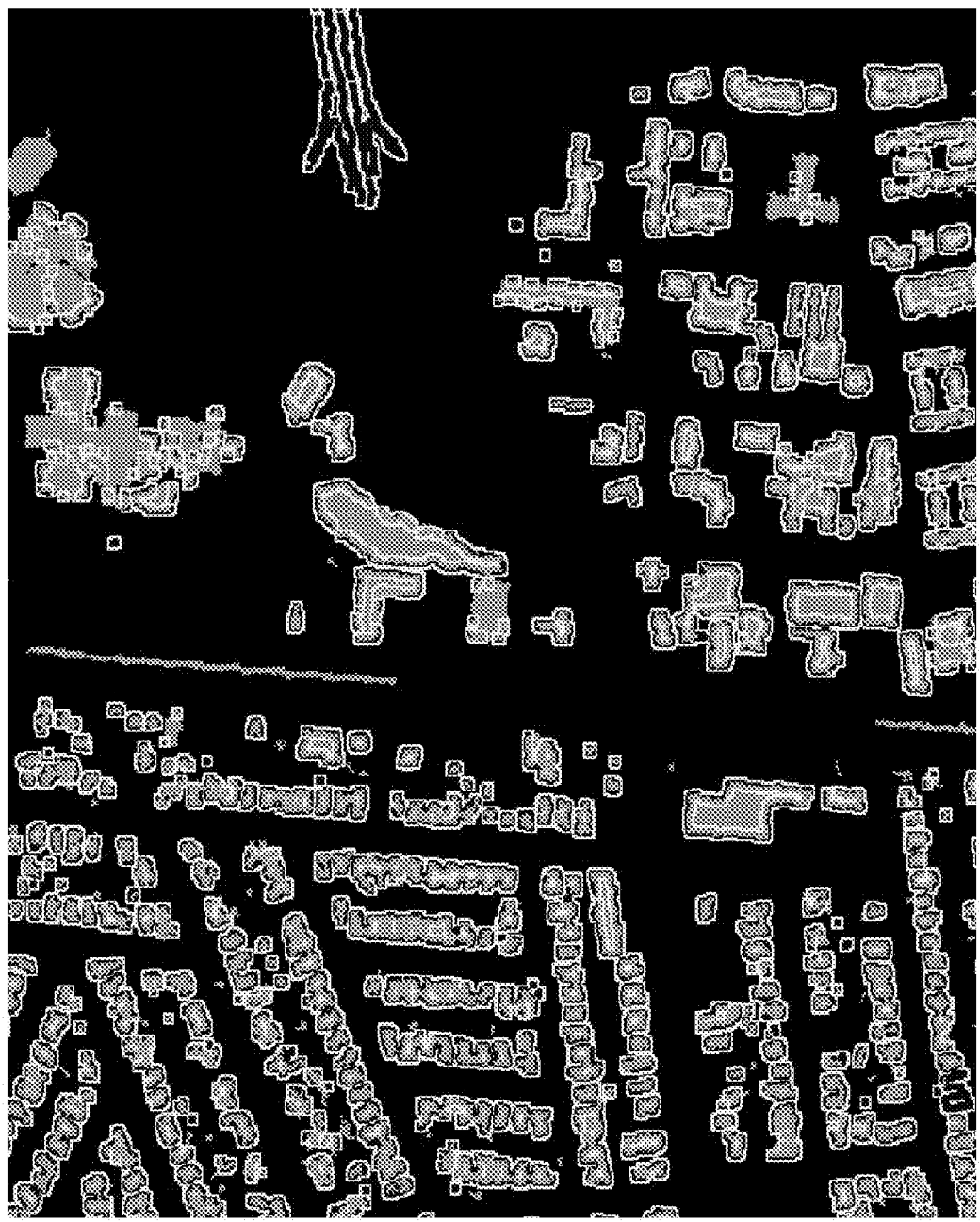
FIG. 9 shows georegistration of LIDAR with digital orthophoto quarter quad (DOQQ)
Figure 10:
FIG. 10 also shows how georegistration of LIDAR with digital orthophoto quarter quad (DOQQ)

FIGS. 9 and 10 show that the GSIview system georegisters LIDAR data with a multispectral imagery counterpart DOQQ. Georegistering, for purposes of this disclosure, is meant to include a single location ground control point (GCP) as well as more extensive descriptions. This capability demonstrates that the inventive system performs georegistration without altering the original spectral and elevation data, and it uses the DOQQ data to remove false results if necessary. Here, georegistration means image registration with input of multiple images in which each pixel's location is referenced to a particular geodetic location, latitude and longitude (lat-long). Such a geodetic location references image is defined as a geoimage in this patent application.

Figure 11:
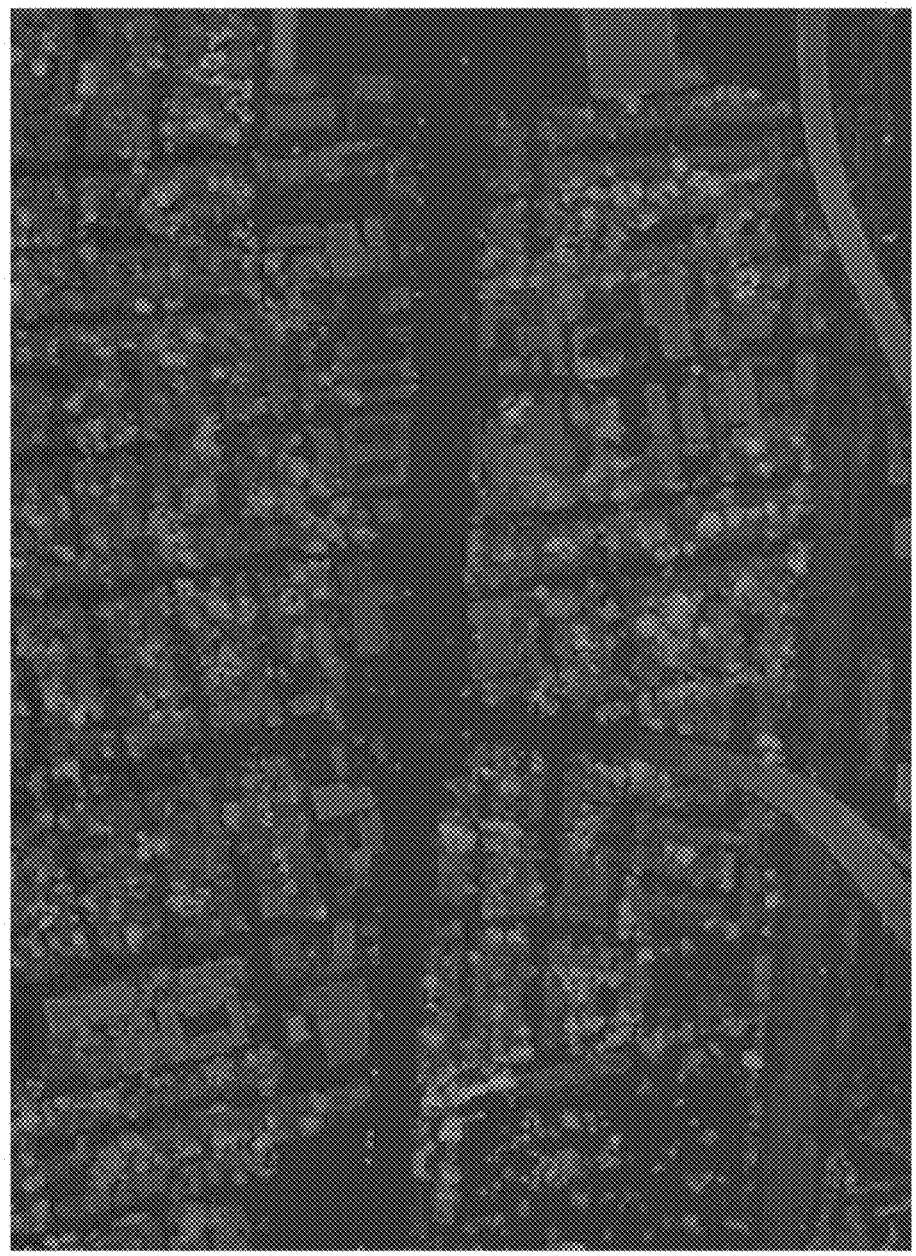
FIG. 11 demonstrates a visualization of features and objects in LIDAR-derived bands, simulating a color infrared scene.

FIG. 11 shows a visualization of features and objects from LIDAR-derived bands. A color infrared scene can be simulated, where vegetation appears as red or pinkish pixels.

Figure 12:
FIG. 12 shows a region of interest (ROI) and multiple signature extraction.

FIG. 12 shows a region of interest (ROI) and a multiple signature extraction. Once an object or region of interest is colored, it is easier to see and it is easier for the user to delimit a region of interest to extract one or more spectral signatures. A parameter adjustable rule set is developed to extract objects and features of interest. In this case, the object is a collection of trees.

Figure 13:
FIG. 13 shows the result of tree extraction by using a parameter-adjustable rule set.

FIG. 13 shows the result of tree extraction by using a parameter-adjustable rule set. The extracted trees are colored in transparent green. The adjustable parameters for the rule set development include, but are not limited to, the following items:

The number of spectral signatures in various combinations;
The size of the object searching grid area;
The signature matching level;
The density of signature matching level.

In general, using a single sensor to perform object and feature extraction results in varying levels of errors of omission and errors of commission. Therefore, the inventive system uses a multi-sensor fusion approach to reject false results. For LIDAR-based object and feature extraction, the use of georegistered multispectral imagery to reject false results produced in the LIDAR domain is an excellent strategy, and the inventive system provides this capability. However, the two sets of images must be converted into geoimages, and then georegistered. One innovative aspect of the invention is to provide such a means by which, after LIDAR and multispectral imagery are georegistered, the original pixel's digital number (DN) values and their geolocations (lat-long) are not altered. Co-pending United States patent applications for this feature are identified by Ser. Nos. 11/074,245, and 10/412,954, filed Mar. 7, 2005 and Apr. 15, 2003, respectively, and are hereby incorporated by reference. The method is known as the Virtual Transverse Mercator (VTM®) projection (Hsu patent no. 7,343,051, issued Mar. 7, 2008). Using UTM zones results in mismatched zones or disorientated images. VTM projection will eliminate those inconsistencies.

FIG. 13 is obtained by using the spectral signatures extracted automatically from a user-selected region of interest, from which the characteristics of each spectral signature is defined with a vector of integers. To complement this user-directed feature extraction module, the inventive system permits the user to deploy a user-handoff approach to extract a set of most generalized spectral signatures from a given scene. This module is called IMaG Automated Signature Generation (ASG) system. A set of user-specified numbers of the most generalized object/feature signatures is extracted. In addition, each pixel in the scene is associated with each of the automatically extracted signatures according to a certain degree of matching association. For each ASG signature, a corresponding image is generated.

Figure 14:
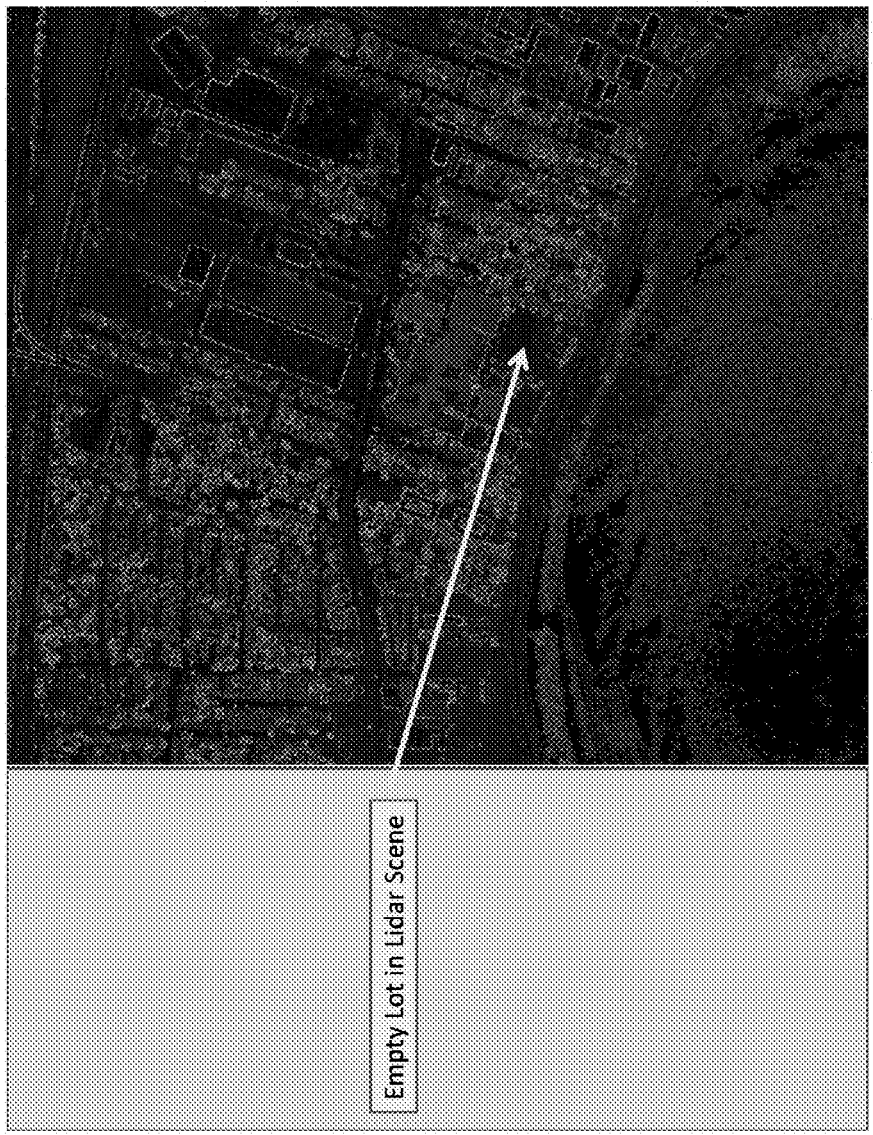
FIG. 14 is a color composite generated from a combination of three ImaG Automated Signature Generation (ASG) signatures (ImaG is a trademark of Susquehanna Research and Environment, Inc.)

Similar to FIG. 12, FIG. 14 shows a color composite generated from a combination of three ASG signatures. The point of interest in FIG. 14 is the structure at the middle of the image with a cross-sign shape that can be a hospital.

Figure 15:
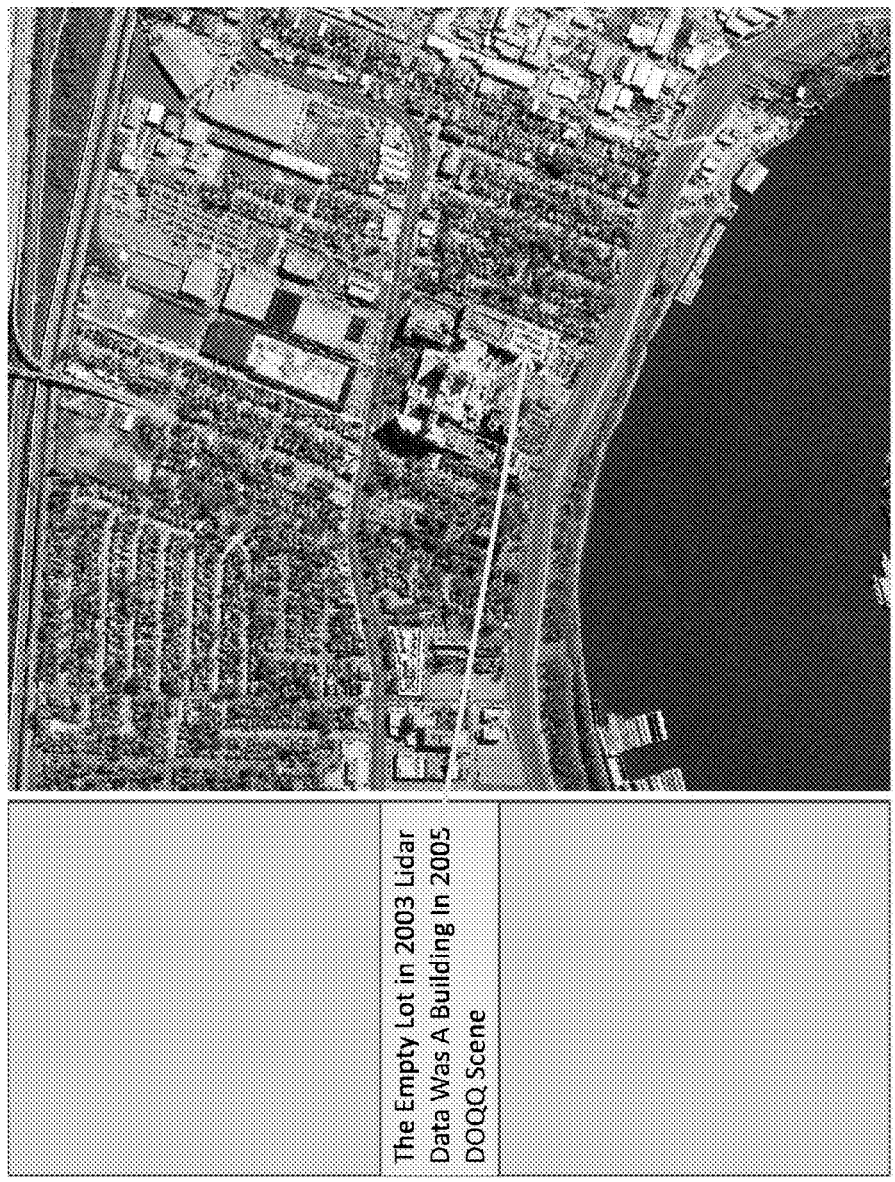
FIG. 15 shows a digital orthophoto quarter quad scene corresponding to FIG. 14.

The georegistered image counterpart of FIG. 14 is a multispectral DOQQ, as shown in FIG. 15. A visual comparison between FIGS. 14 and 15 centered on the "cross-sign" building area reveals that an annex building has been added to the 2005 DOOQ scene. The new building location in FIG. 14 was previously a "dark" empty region. This comparison leads the inventive system to provide a means for change detection. For this case the change detection detects structural unit changes. By the same principle, change detection can be performed using two sets of georegistered multispectral imagery.

Figure 16:
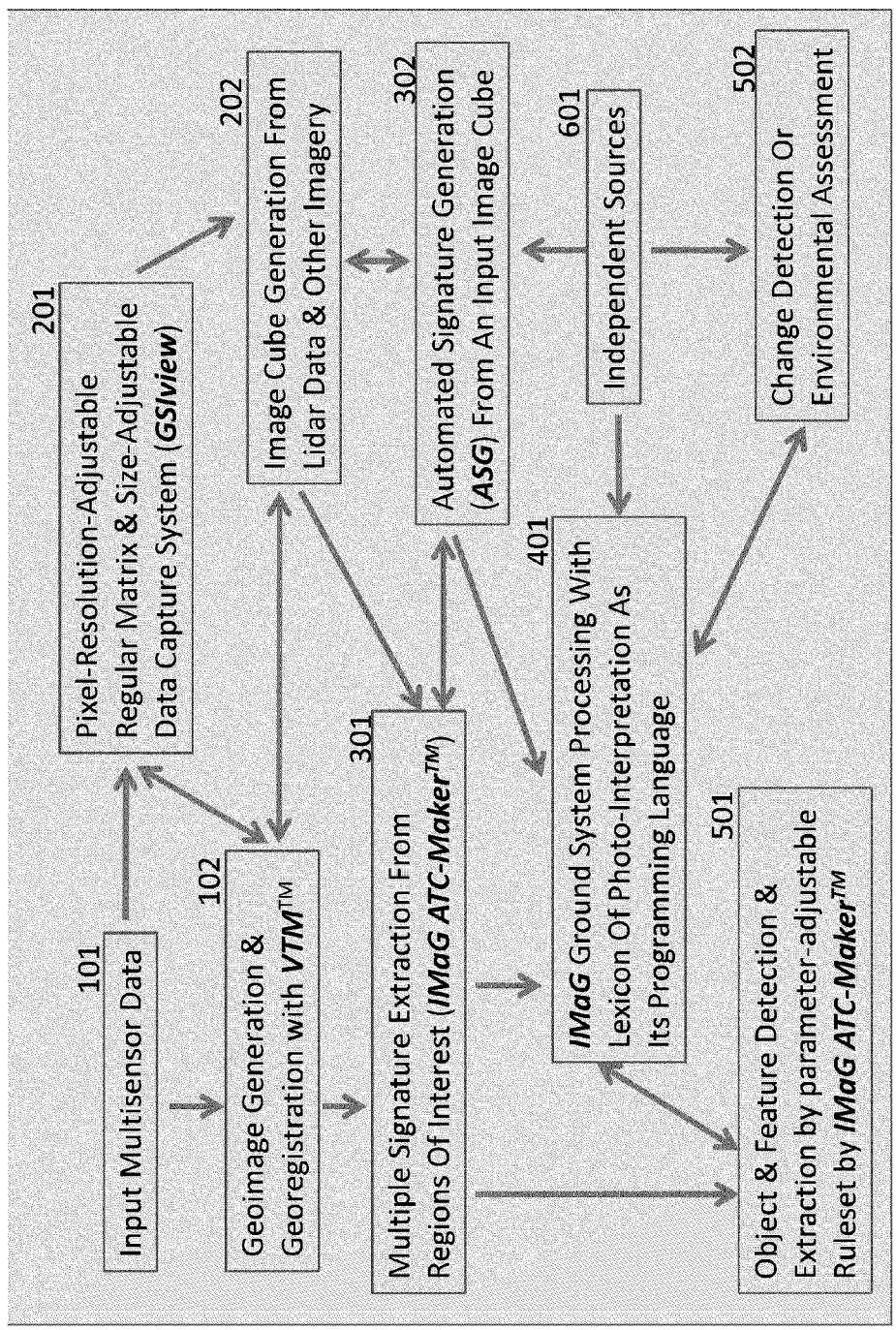
FIG. 16 is a schematic diagram of the inventive system depicting system component modules.

FIG. 16 is a schematic diagram summarizing the inventive system in terms of system component modules. Module 101 represents input data sources that include LIDAR and other sensor data and imagery. Module 102 performs geoimage generation and georegistration using the data from module 101. Module 201 is the major LIDAR data processing system that accepts csv data and converts it to a set of images by parameter-specified pixel resolution levels and search-area-size levels. The GSlview system interacts with the geoimage and georegistration module 102 as well. Module 202 is the output from module 201, fusing multiple data types, when present, and fusing them; and it interacts with module 102. Module 301 is IMaG ATC-Maker® that extracts multiple spectral signatures from a region of interest, and then passes them over to module 501 for object and feature extraction using parameter adjustable rule sets. Data from modules 301 and 501 can be applied to module 401 for object and feature extraction using IMaG ground system that uses a photo-interpretation lexicon as its programming language.

Module 302 is an Automated Signature Generation (ASG) system that uses an image cube and automatically extracts a set of spectral signatures whose number is specified by the user. Unlike IMaG ATC-Maker®, ASG-generated spectral signatures are not specific to a given pixel location. Instead, the signatures are generalized across the entire scene; therefore, it can be called the most generalized spectral signatures. In addition, for each ASG signature, there is a corresponding image in which each pixel is associated with all the extracted ASG signatures by a probability-like function.

In addition, the ASG system 302 can accept independent sources, or module 601, whose signatures are preset. Therefore ASG accepts either (1) no-preset, or (2) preset, or (3) a combination of preset and no-preset signatures to generate the most generalized signatures. The output is applied to either module 501 (IMaG Ground System), or module 301 (IMaG ATC-Maker®) or both for object and feature extraction.

Lastly, with the input of multi-temporal data and imagery, the inventive system is capable of performing general change detection or specific environmental assessment from change detection. In general, change detection is performed at module 401, IMaG Ground System.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A method of capturing, analyzing and visualizing fundamentally discrete distribution data, into a matrix of data for object and feature extraction, the steps comprising:

a) reading into a processor data representative of a plurality of data types, by a data capture system;

b) overlaying a control grid over said matrix of data to form a regular matrix comprising a plurality of cells, the plurality of cells having a predetermined resolution;

c) creating a predetermined data search spatial radius from a point in each cell; and d) capturing data characteristics of said matrix of data using a specified parameter by at least one data variable and representing each data variable at each cell of said regular matrix;

e) outputting said captured data characteristics using data from within said search radius at each cell of said regular matrix.

2. The method of capturing, analyzing and visualizing a matrix of data for object and feature extraction in accordance with claim 1, wherein said matrix of data is distributed by at least one of the group: regularly and irregularly.

3. The method of capturing, analyzing and visualizing a matrix of data for object and feature extraction in accordance with claim 1, wherein said data characteristics are selected from the group: minimum, average, maximum, closest to cell center, and the difference of the maximum and the minimum.

4. The method of capturing, analyzing and visualizing a matrix of data for object and feature extraction in accordance with claim 1, wherein said data capture system includes means for specifying a data search range.

5. The method of capturing, analyzing and visualizing a matrix of data for object and feature extraction in accordance with claim 1, wherein said captured data characteristics is chosen from the group: at least one image, at least one data matrix, and a color composite.

6. The method of capturing, analyzing and visualizing a matrix of data for object and feature extraction in accordance with claim 1, wherein said captured data characteristics comprises an image with a set of measurements selected from the group: distance, elevation, and data characteristics variables, further comprising at least one of: minimum, maximum, average, the difference of the maximum and the minimum, closest to the matrix point, and density.

7. A method of capturing, analyzing and visualizing fundamentally discrete distribution data into a matrix of data for object and feature extraction in the steps comprising:

a) reading into a processor data representative of a plurality of data types, by a data capture system;

b) overlaying a control grid over said matrix of data to form a regular matrix comprising a plurality of cells, the plurality of cells having a predetermined resolution;

c) creating a predetermined data search spatial radius from a point in each cell;

d) capturing data characteristics of said matrix of data by at least one data variable and representing each data variable at each cell of said regular matrix cell;

e) outputting said captured data characteristics using data from within said search radius at each cell of said regular matrix; and f) analyzing the output of said captured data variables for signature, object and feature extraction.

8. The method of capturing, analyzing and visualizing a matrix of data for object and feature extraction in accordance with claim 7, wherein said analyzing step (f) comprises performing signature extraction comprising at least one signature.

9. The method of capturing, analyzing and visualizing a matrix of data for object and feature extraction accordance with claim 7, wherein said analyzing step (f) comprises performing object and feature extraction based on at least one of the group: output data set, image, and matrix.

10. The method of capturing, analyzing and visualizing a matrix of data for object and feature extraction in accordance with claim 7, wherein said signature extraction is performed by at least one of the group: interactively and automatically.

11. The method of capturing, analyzing, and visualizing a matrix of data for object and feature extraction in accordance with claim 9, wherein said object extraction is based on at least one signature.

12. The method of capturing, analyzing and visualizing a matrix of data for object and feature extraction in accordance with claim 1, the steps further comprising:

e) using a rule set to perform object and feature extraction; and f) outputting the object and feature extraction result.

13. The method of capturing, analyzing and visualizing a matrix of data and feature extraction in accordance with claim 12, wherein said rule set is based on at least one spectral signature.

14. The method of capturing, analyzing and visualizing a matrix of data for object and feature extraction in accordance with claim 12, wherein said rule set is chosen from the group: not spectral signature based, and parameter based, parameters thereof being chosen from the group: a number of spectral signatures, data searching grid size, spectral signature matching level, and density of the matched spectral signatures.

15. The method of capturing, analyzing and visualizing a matrix of data for object and feature extraction in accordance with claim 14, wherein said input to said non-spectral signature comprises at least one of the sources: at least one raw input image band; at least one generated image band from irregular matrix data; at least one generated image band from regular matrix data; at least one image band generated by an IMaG Automated Signature Generation (ASG) system; and at least one image band generated by an IMaG ATC-Maker® system.

16. The method of capturing, analyzing and visualizing a matrix of data for object and feature extraction in accordance with claim 15 wherein said IMaG ASG system comprises a lexicon of photo-interpretation.

17. The method of capturing, analyzing and visualizing a matrix of data for object and feature extraction in accordance with claim 1, the steps further comprising:

f) georegistering said matrix of data; and g) outputting said georegistered data.

18. The method of capturing, analyzing and visualizing a matrix of data for object and feature extraction in accordance with claim 17, the steps further comprising:

h) analyzing said georegistered data input sources by a rule set; and i) outputting results of said analyzing step (h).

19. The method of capturing, analyzing and visualizing a matrix of data for object and feature extraction in accordance with claim 1, the steps further comprising:

f) prior to said outputting step (e), fusing data types.

* * * * *